Patented Dec. 30, 1930

1,787,258

UNITED STATES PATENT OFFICE

CLAYTON OLIN NORTH, OF NITRO, WEST VIRGINIA, ASSIGNOR TO THE RUBBER SERVICE LABORATORIES CO., OF AKRON, OHIO, A CORPORATION OF OHIO

COMPOSITION FOR USE IN THE MANUFACTURE OF RUBBER AND THE LIKE

No Drawing.     Application filed August 24, 1929.   Serial No. 388,279.

The object of the present invention is the manufacture of a composition of matter suitable for incorporation in an unvulcanized rubber mix, wherein it is found to function as a valuable vulcanization accelerator. The composition preferably comprises an aldehyde derivative of a Schiff's base, a homogenizing agent of oleaginous nature and an aromatic fluidifying agent that is a solvent of all ingredients.

One method whereby the new composition of matter may be prepared is as follows. Approximately 150 parts of the reaction product of substantially three molar portions of butylaldehyde and substantially one molar portion of aniline, prepared preferably according to the method set forth in my pending application Serial No. 376,270, filed July 5, 1929, are placed in a reactor and substantially 170 to 210 parts of a coal tar product, for example, creosote oil added thereto. To the solution thus obtained there were added substantially 240 parts of the material formed by the reaction of substantially three parts of acetaldehyde with substantially two parts of aniline, which product was prepared according to the method disclosed in U. S. Patent No. 1,659,152, granted February 14, 1928. After all the materials have been introduced into the reactor, the mass is heated sufficiently to obtain a uniform product, for example, to substantially 50° C. for approximately one hour with agitation. The resulting product constitutes one example of my new composition of matter.

If convenient or desirable in the preparation of the material as hereinbefore described, a portion of the creosote may be substituted with a vegetable oil, for example, pine oil. Thus, substantially 150 parts of the reaction product of three molar portions of butylaldehyde and one molar portion of aniline were placed in a reactor and substantially 85 to 105 parts of a coal tar product, for example creosote oil, and substantially 85 to 105 parts of a vegetable oil, for example pine oil, were added. To the material thus formed, substantially 240 parts of the material formed by the reaction of substantially three parts of acetaldehyde with substantially two parts of aniline, were added. After all the materials were in the reactor the mass was heated and agitated at approximately 50° C. for about one hour. The resulting product constituted one of the preferred type of materials.

Other ratios of the constituents than those set forth in the foregoing examples have been employed in the preparation of the new composition of matter. Thus, for example, substantially 230 parts of the reaction product of three molar portions of acetaldehyde and two molar portions of aniline, substantially 140 parts of the reaction product of three molar portions of butylaldehyde and one molar portion of aniline, substantially 150 parts creosote oil, substantially 50 parts of pine oil and substantially 5 parts of aniline are heated in the manner previously described to form the preferred composition of matter.

Again, substantially 160 parts of the butylaldehyde-aniline reaction product, substantially 240 parts of the acetaldehyde-aniline reaction product, substantially 45 parts of creosote oil, and substantially 135 parts of pine oil are heated in the manner hereinbefore described to form an example of the new composition of matter.

As another example of the new composition of matter, substantially 165 parts of the butylaldehyde-ailine reaction product, substantially 250 parts of the acetaldehyde-aniline reaction product, substantially 90 parts of creosote oil, and substantially 90 parts of pine oil were heated in a manner hereinbefore described.

The present invention then broadly comprises as a new composition of matter the material formed by combining the reaction product of substantially three molar portions of butylaldehyde and substantially one molar portion of aniline, the reaction product of substantially three molar portions of acetaldehyde and substantially two molar portions of aniline, a coal tar product, preferably creosote oil, and additionally, if desirable, a vegetable oil, for example pine oil.

Having thus described certain embodiments of the invention, what is claimed is:

1. As a new composition of matter, the product formed by combining the reaction product of substantially three molar portions of butylaldehyde and one molar portion of aniline, the reaction product of substantially three molar portions of acetaldehyde and substantially two molar portions of aniline and creosote oil.

2. As a new composition of matter the product formed by combining the reaction product of substantially three molar portions of butylaldehyde and one molar portion of aniline, the reaction product of substantially three molar portions of acetaldehyde and substantially two molar portions of aniline, creosote oil and pine oil.

3. A new composition of matter comprising substantially 24 to 28 per cent. of the reaction product of three molar portions of butylaldehyde and one molar portion of aniline, substantially 40 to 43 per cent. of the reaction product of three molar portions of acetaldehyde and two molar portions of aniline, and less than 31 per cent. of creosote oil.

4. A new composition of matter comprising substantially 24 to 28 per cent. of the reaction product of three molar portions of butylaldehyde and one molar portion of aniline, 40 to 43 per cent. of the reaction product of three molar portions of acetaldehyde and two molar portions of aniline, substantially 8 to 26 per cent. of creosite oil and substantially 9 to 24 per cent. of pine oil.

5. A new composition of matter comprising substantially 26.8 per cent. of the reaction product of substantially three molar portions of butylaldehyde and substantially one molar portion of aniline, substantially 42.8 per cent. of the reaction product of three molar portions of acetaldehyde and two molar portions of aniline, substantially 15.2 per cent. of creosote oil and substantially 15.2 per cent. of pine oil.

6. A composition of matter comprising an aldehyde-amine reaction product and creosote oil.

7. A composition of matter comprising a butylaldehyde-aniline reaction product and creosote oil.

8. A composition of matter comprising a polyaldehyde-aniline reaction product and creosote oil.

9. A composition of matter comprising an aldehyde derivative of a Schiff's base, an oleaginous homogenizer and an aromatic fluidifying agent.

In testimony whereof I hereunto affix my signature.

CLAYTON OLIN NORTH.